US011095717B2

(12) United States Patent
Gkoufas et al.

(10) Patent No.: US 11,095,717 B2
(45) Date of Patent: Aug. 17, 2021

(54) MINIMIZING DATA LOSS IN A COMPUTER STORAGE ENVIRONMENT WITH NON-GUARANTEED CONTINUOUS NETWORK CONNECTIVITY

(71) Applicant: INTERNATIONAL BUSINESS MACHINES CORPORATION, Armonk, NY (US)

(72) Inventors: Yiannis Gkoufas, Dublin (IE); Michele Gazzetti, Dublin (IE); Andrea Reale, Dublin (IE); Konstantinos Katrinis, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/962,083

(22) Filed: Apr. 25, 2018

(65) Prior Publication Data
US 2019/0334993 A1 Oct. 31, 2019

(51) Int. Cl.
| H04L 29/08 | (2006.01) |
| H04L 12/66 | (2006.01) |
| G06F 3/06 | (2006.01) |
| G06F 16/182 | (2019.01) |
| H04W 84/18 | (2009.01) |

(52) U.S. Cl.
CPC .............. *H04L 67/12* (2013.01); *G06F 3/067* (2013.01); *G06F 16/182* (2019.01); *H04L 12/66* (2013.01); *H04L 67/10* (2013.01); *H04W 84/18* (2013.01)

(58) Field of Classification Search
CPC ......... H04L 67/12; H04L 12/66; H04L 67/10; H04W 84/18; G06F 16/182; G06F 3/067
See application file for complete search history.

(56) References Cited

U.S. PATENT DOCUMENTS

| 8,886,705 B1 * | 11/2014 | Tewari ................ G06F 16/1837 709/203 |
| 2015/0212902 A1* | 7/2015 | Horspool .............. G06F 3/0608 707/654 |
| 2016/0350357 A1* | 12/2016 | Palmer ................ G06F 16/2365 |
| 2017/0060574 A1 | 3/2017 | Malladi et al. |
| 2017/0078435 A1 | 3/2017 | Babol et al. |

OTHER PUBLICATIONS

Mayer et al., "The Fog Makes Sense: Enabling Social Sensing Services With Limited Internet Connectivity," SocialSens'17, Apr. 18-21, 2017 (6 pages).

* cited by examiner

*Primary Examiner* — Abdulkader M Alriyashi
(74) *Attorney, Agent, or Firm* — Griffiths & Seaton PLLC

(57) ABSTRACT

Embodiments for preventing data loss in a computing storage environment by a processor. One or more offline events in a locality failing to have continuous network connectivity may be detected. An ad-hoc distributed file system, having one or more edge devices associated with the locality, may be created for storing data produced during the one or more offline events.

20 Claims, 9 Drawing Sheets

MINIMIZING DATA LOSS IN A COMPUTER STORAGE ENVIRONMENT WITH NON-GUARANTEED CONTINUOUS NETWORK CONNECTIVITY

BACKGROUND OF THE INVENTION

Field of the Invention

The present invention relates in general to computing systems, and more particularly, to various embodiments for minimizing data loss in a computer storage environment with non-guaranteed continuous network connectivity using a computing processor.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. The amount of information to be processed nowadays increases greatly. However, often times computing systems may experience temporary communication or network disruptions that impact the processing, storing, communicating, or handling of data. Therefore, processing, storing, communicating, or handling of data during a network disruption is a key problem to solve.

SUMMARY OF THE INVENTION

Various embodiments for minimizing data loss in a computer storage environment with non-guaranteed continuous network connectivity by a processor are provided. In one embodiment, by way of example only, a method for preventing data loss in an internet of things (IoT) environment, again by a processor, is provided. One or more offline events in a locality failing to have continuous network connectivity may be detected. An ad-hoc distributed file system, having one or more edge devices associated with the locality, may be created for storing data produced during the one or more offline events.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
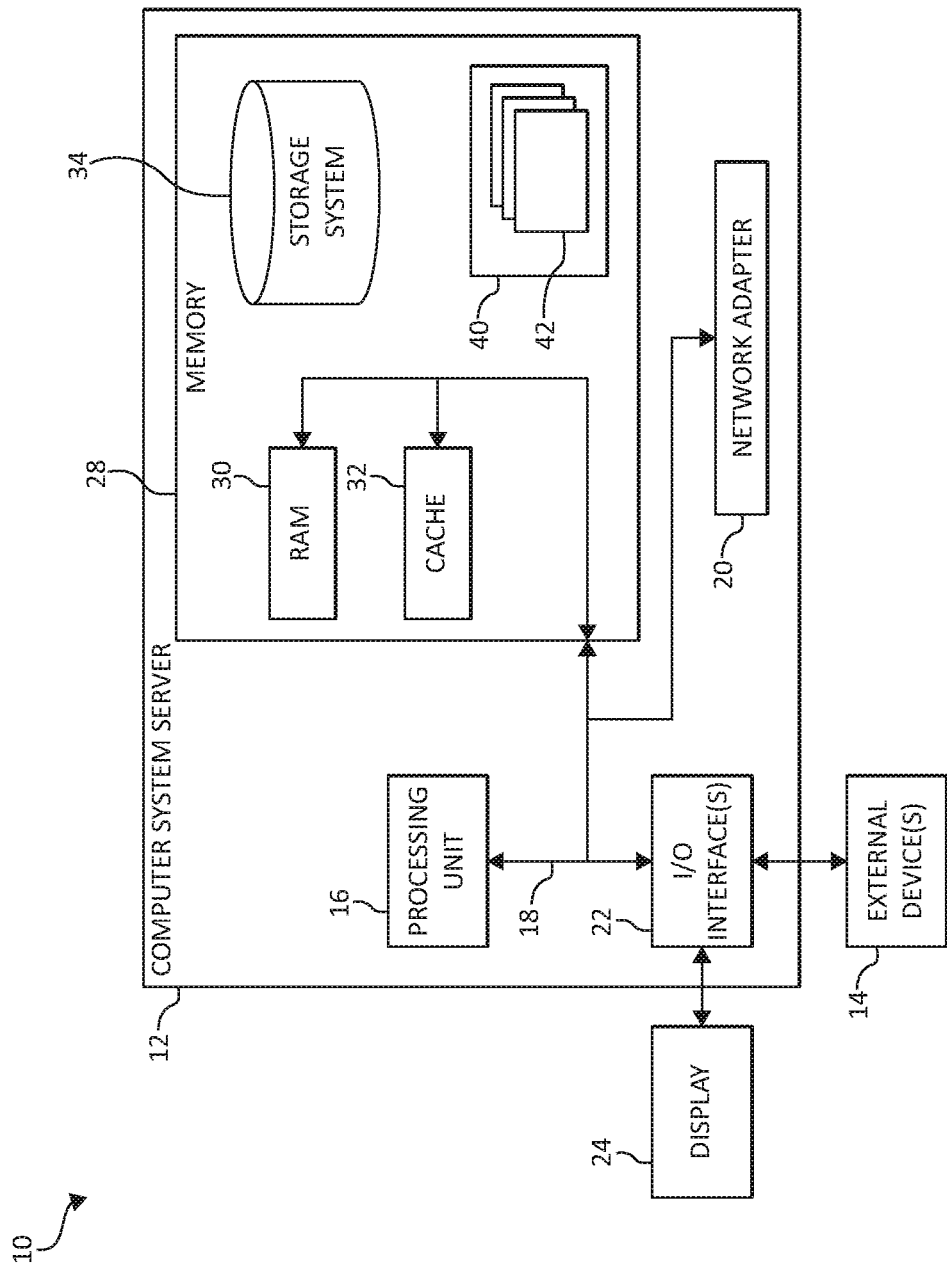
FIG. 1 is a block diagram depicting an exemplary cloud computing node according to an embodiment of the present invention.

Computing systems may include various applications that produce one or more data streams. Data stream producing applications are becoming increasingly relevant in many growing businesses, government, and educational scenarios (e.g., internet of things "IoT", financial, distributed transaction process, and the like). These applications are often part of larger distributed systems made of components spread across a Wide Area Network ("WAN") (e.g., applications running on local infrastructure sending data to the Cloud for global coordination, processing or archival needs). As mentioned previously, often times these computing systems such as, for example, a networked computing system that may include cloud storage, may experience temporary communication or network disruptions that impact processing, storing, communicating, or handling of data. Data loss during a temporary, network disruption event such as, for example, WAN disruptions (e.g., loss of connectivity or bandwidth degradation) can have a negative computing efficiency and financial impact.

To prevent data loss, current systems rely on local (primary or secondary) storage to buffer during disruptions, however, long disruptions and steady data rates can deplete storage quickly. This problem is exacerbated in situations where the storage capacity is relatively limited (e.g., mobile devices or embedded devices in IoT/Edge scenarios). For example, in the event of lost network connectivity, message brokers responsible for delivering data streams over the Wide Area Network ("WAN") rely on primary or secondary memory storage to buffer data until connectivity is restored. However, long periods of time of network connectivity disruptions along with steady data production rates can rapidly deplete storage (e.g., primary or secondary memory storage) on a centralized computing node (e.g., Internet of Things ("IoT" broker/gateway). This problem (e.g., storage capacity reaching maximum capacity) is exacerbated in situations where the storage capacity is relatively limited (e.g., mobile devices, embedded devices in IoT/Edge, etc.) Being able to optimize the use of storage in a locality and network for reliability during disruptions according to application-driven semantics can mitigate or otherwise avoid the problem.

Accordingly, mechanisms of the illustrated embodiments provide a solution for minimizing data loss in a computer storage environment (or in an IoT computing environment) with non-guaranteed continuous network connectivity (e.g., an edge or cloud computing environment). In one aspect, one or more offline events in a locality failing to have continuous network connectivity may be detected. An ad-hoc distributed file system, having one or more edge devices associated with the locality, may be created for storing data produced during the one or more offline events.

In an additional aspect, the present invention provides for minimizing data losses during offline periods (e.g., offline events) in a locality within an unstable network (e.g., network connectivity instability such as, for example, losing network connectivity between networked computing devices) and a varying number of participating edge devices producing data streams. In one aspect, upon a gateway device of the locality detecting that connectivity with the cloud is lost (e.g., network connectivity disruption), an ad-hoc distributed file system ("DFS") may be initiated and created. A DFS (e.g., an ad-hoc DFS) may include members of a set of the participating edge devices. An agent running on the device (e.g., edge device) may write the outgoing data in the newly created ad-hoc DFS rather than forwarding the outgoing data to the gateway. In one aspect, one or more instructions or messages may be communicated to the agent for instructing the agent to write the outgoing data to the newly created ad-hoc DFS. In this way, the edge devices may leverage a totality of the available disk space of all the participating edge devices as compared to only using the storage of the particular edge device. Once the gateway detects that network connectivity is restored, the gateway may communicate (e.g., messages and instructions) to the agents on the edge devices to resume the data forwarding operation. The agent may the forward to the gateway the data that was stored in the ad-hoc DFS during the offline period to the cloud infrastructure.

In one aspect, the present invention relates to optimization of storage and network usage by a set of applications that run in a "tightly connected locality" (e.g., a local area network) and that produce continuous streams of data that need to be shipped or sent outside the locality over an intermittent and/or unstable network. The present invention provides the optimization by minimizing data loss in a computer storage environment with non-guaranteed continuous network connectivity. In one aspect, the present invention provides an application operating on one or more endpoints (e.g., an edge gateway) that may spawn (e.g., organize, create, or assemble) an ad-hoc DFS that includes one or more of the endpoints, having one or more storage devices, that may be in association with the application when an offline incident is detected. In one aspect, data originating from one or more devices attached to the ad-hoc DFS may be saved and then subsequently propagate the data (which is stored in the ad-hoc DFS during the offline incident) to a cloud computing device upon restoring network connectivity. The present invention may also be applied to IoT/Edge applications that continuously upload data to a cloud storage environment despite intermittent/unstable WAN network connectivity.

In one aspect, the present invention detects offline periods/offline events in a locality (edge infrastructure) having an unreliable network connectivity and creates an ad-hoc distributed file system comprising of edge devices belonging to the locality for storing data produced during the offline period, thereby preventing data loss. More specifically, the present invention enables a gateway device, of the locality, to both detect that connectivity with a cloud computing storage system may be lost and may initiate (dynamically and on-demand) an ad-hoc distributed file system. One or more agents executing on the edge devices may write outgoing data to the ad-hoc distributed file system. The present invention may also determine whether the connectivity with the cloud storage is restored and may also enable the agents on the edge devices to resume data forwarding to the gateway device. The present invention enables a gateway device of the locality to also read data produced during the offline period from the distributed file system and forward the data to the cloud storage for further analytics.

In an additional aspect, the present invention may detect offline periods (connectivity loss) in a locality (edge infrastructure) with unreliable network connectivity and utilize a local time-series database for storing sensor data (e.g., Internet of Things "IoT" sensor data) during the offline periods. The mechanisms of the present invention may determine whether a network communication link between one or more computing devices and one or more monitoring servers has failed and may notify or alert a cache for storing data from the one or more computing devices. The mechanisms of the present invention may determine whether the network communication link to the monitoring server is restored and the cache may forward the stored data (during the offline period) to the monitoring server. The one or more computing devices may resume data forwarding to the monitoring server.

In one aspect, as used herein, a message may be a bounded sequence of bytes that can be routed through a local or the external network. A data stream may be a logically unbounded sequence of messages with each message containing one data point. Each data stream (as the entire stream) may be identified by a unique name or identifier. An application may be a producer of one or more data streams running on one or more devices. An agent may be an application responsible for forwarding data produced by one or more (or a set) of applications running on a device to a gateway device. A device (e.g., edge device) may be a computing device with networking capabilities. Devices may be a general processor, special processors, an embedded general-purpose system on a chip "SoC," and/or a sensor device. A locality may be a set of devices interconnected to each other via a stable and reliable local network, usually some form of a LAN. The locality also connects to the public network, either via aggregation points (gateways) and/or via one or more devices.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
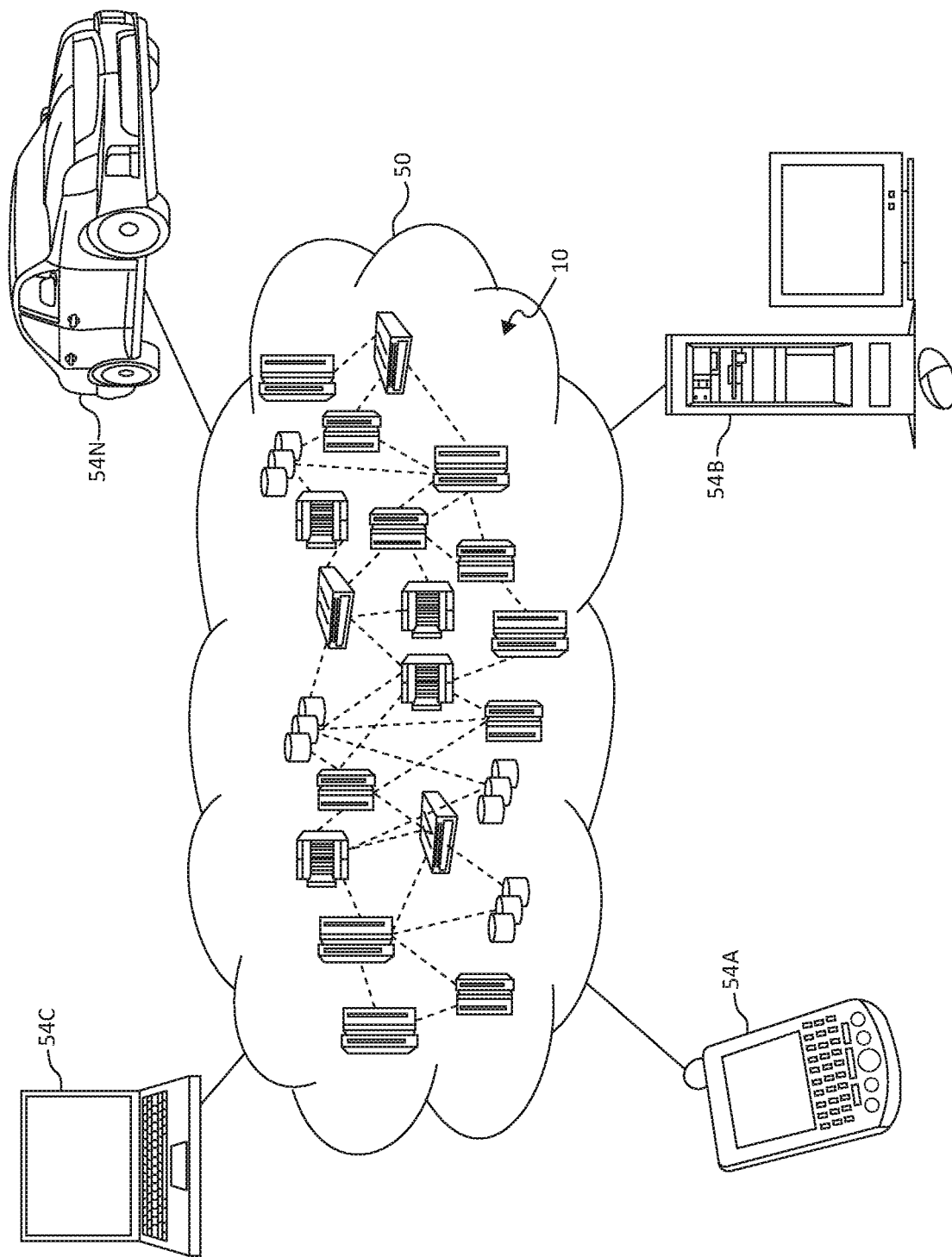
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
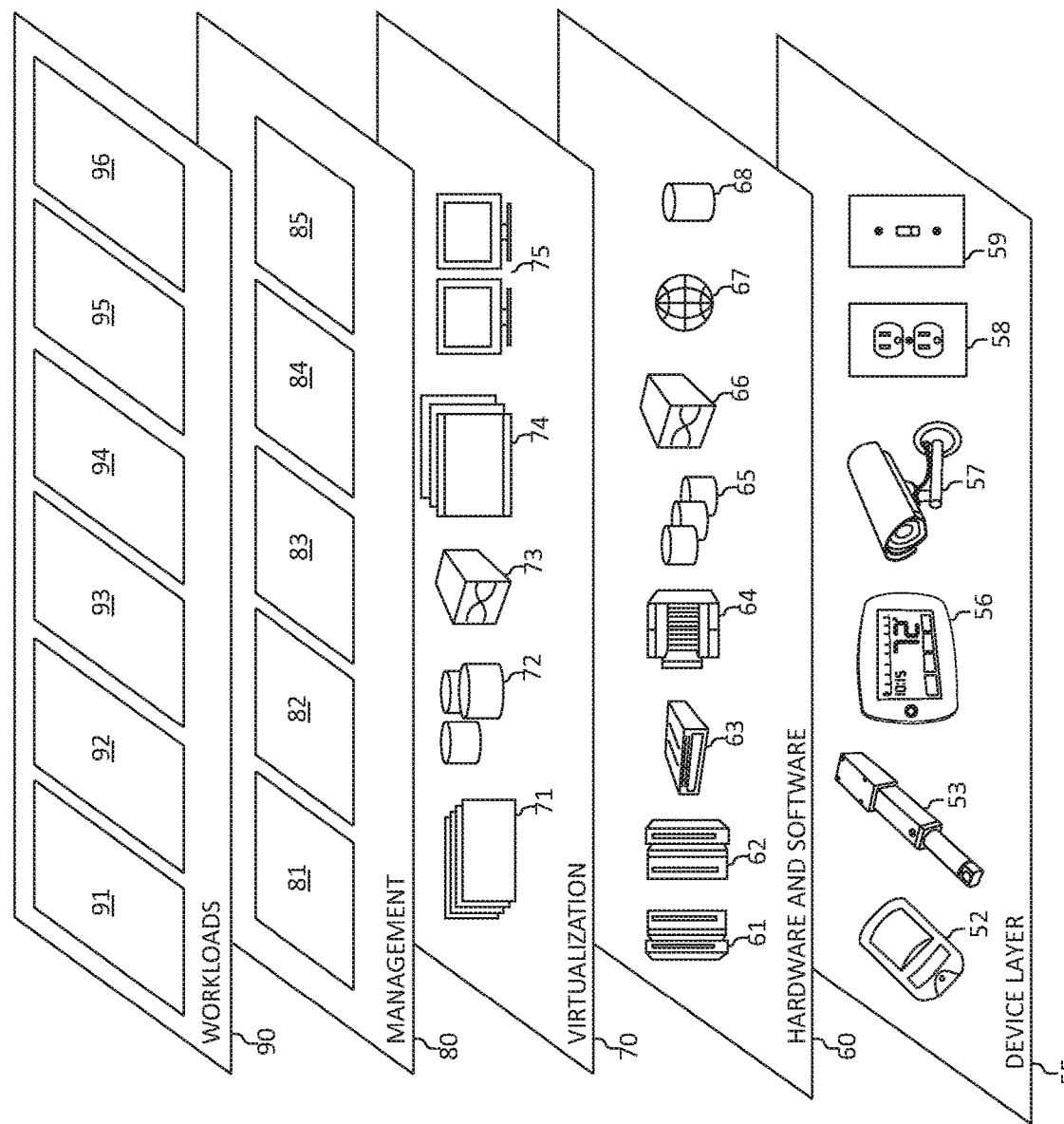
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for minimizing data loss in a computer storage environment with non-guaranteed continuous network connectivity. In addition, workloads and functions 96 for minimizing data loss in a computer storage environment with non-guaranteed continuous network connectivity may include minimizing data loss operations, and as will be further described. One of ordinary skill in the art will appreciate that the workloads and functions 96 for minimizing data loss in a computer storage environment with non-guaranteed continuous network connectivity may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4A:
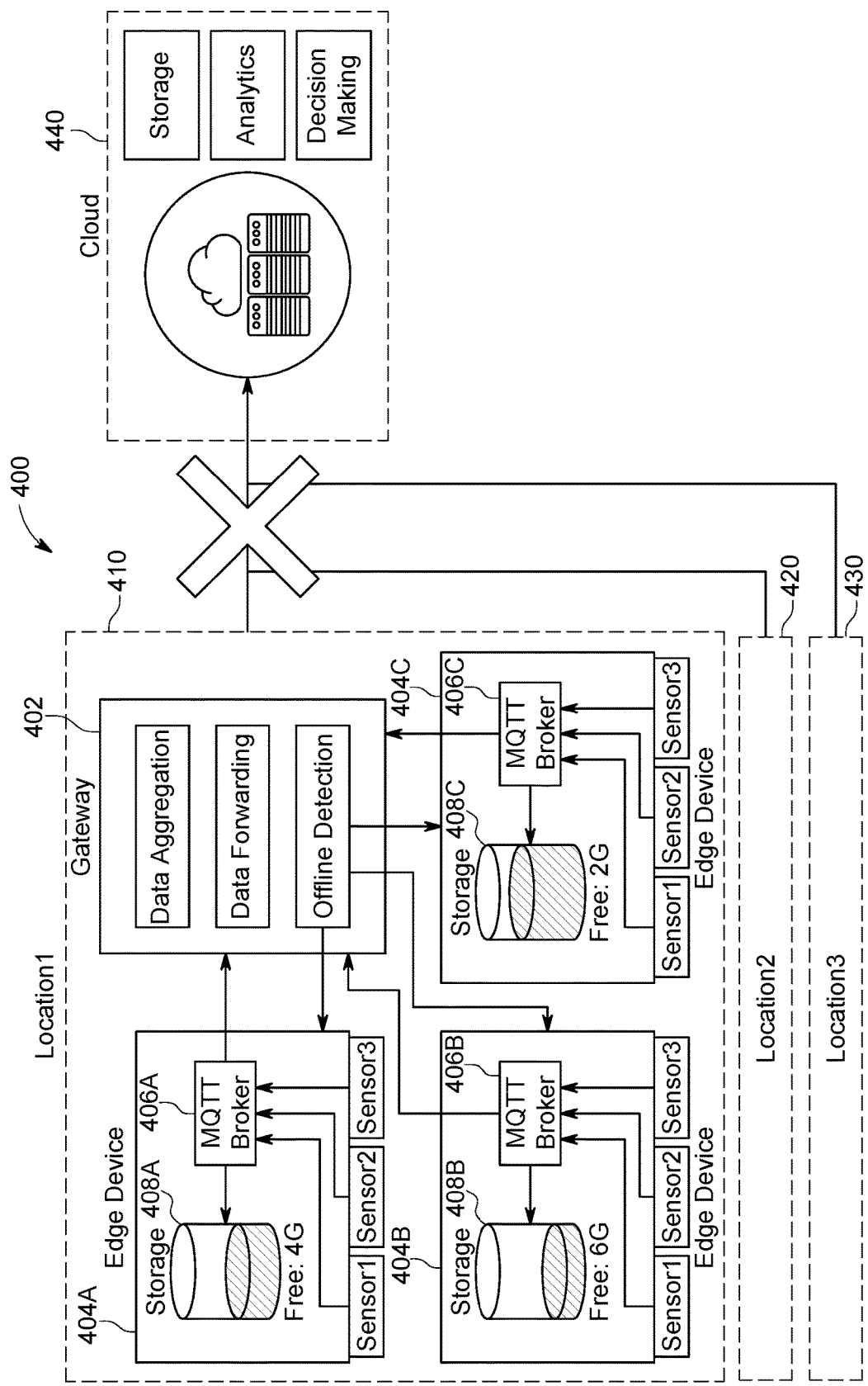
FIGS. 4A-4B are additional block diagrams depicting various user hardware and cloud computing components functioning in accordance with aspects of the present invention.

As described herein, the present invention solves the challenge of minimizing data loss in a computer storage environment with non-guaranteed continuous network connectivity. In one aspect, a location data hub (e.g., message queuing telemetry transport "MQTT") may be employed to minimize data loss, as illustrated in FIG. 4A. As depicted, FIG. 4A includes a system architecture 400 that may include one or more locations (e.g., location 1 410, location 2 420, and/or location 3 430), one or more edge devices (e.g., edge devices 404A-C), a gateway 402 (having data aggregation, data forwarding, and/or offline detection capabilities), and a cloud computing environment 440 (which may include data storage, decision making components/functionality, and/or data analytic components/functionality). In one aspect, each edge device (e.g., edge devices 404A-C) may include an MQTT (e.g., an MQTT 406A-C or "MQTT broker"), one or more sensors (e.g., sensors 1-3) and/or a storage device (e.g., storage 408A-C).

An MQTT is a lightweight message exchange protocol and may be used in an Edge/IoT platform. In an Edge/IoT solution, data originating from edge devices and sensors are pushed to the cloud encapsulated in MQTT messages. MQTT brokers 406A-C can be used as a bridge between the data published on the edge and the cloud computing environment 440. When an offline period is detected (illustrated with the "X" on the network connection of FIG. 4A), an MQTT broker (e.g., MQTT broker 406A) stores the data produced locally in the local storage (e.g., 408A of the particular device (e.g., edge device 404A)). When the edge device (e.g., edge device 404A) is reconnected to the cloud computing system 440, the MQTT broker (e.g., MQTT broker 406A) reads the stored data and forwards them to the cloud computing system 440.

Figure 4B:
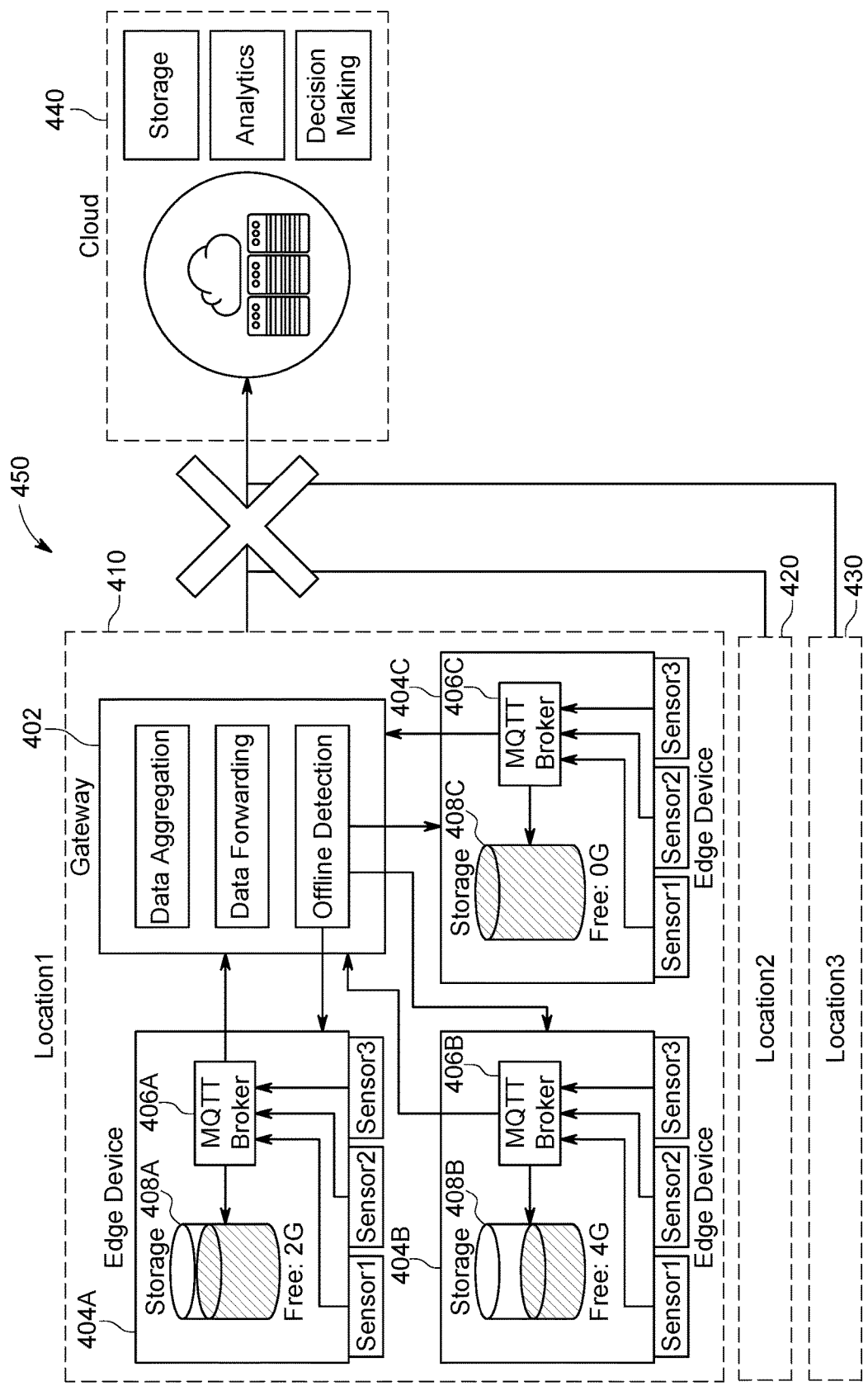

When the localities (e.g., localities 1, 2, and/or 3) and cloud computing environment 440 connectivity are not experiencing network connectivity failures, there is no need to utilize permanent storage (e.g., storage 408A-C) in the locality (e.g., localities 1, 2, and/or 3). The data collected from the sensors (e.g., sensors 1, 2, and/or 3) attached to each device (e.g., edge devices 404A-C), may be sent to the gateway 402. The gateway 402 performs optional data processing tasks and sends and/or mirrors the output of the edge devices to the cloud computing environment 440 for further analysis and storage. During offline periods, however, the MQTT broker(s) (e.g., MQTT broker 406A) in the locality (e.g., location 1 410, location 2 420, and/or location 3 430) stores data streamed by sensors (e.g., sensors 1, 2, or 3) on permanent storage (e.g., storage 408A-C) locally attached to each broker (e.g., MQTT broker 406A). When connectivity is restored, the MQTT broker(s) may flush the data stored during the offline period from the locally attached storage and to the cloud computing environment 440, as depicted in FIG. 4B. However, the challenge presented in FIGS. 4A-B demonstrates that when there is a long enough offline period relative to the capacity of permanent storage (e.g., storage 408A) attached to an MQTT broker (e.g., 406A) and relative to sensor data production rate (e.g., sensor 1, 2, and/or 3), there is a substantial and potential risk of data loss due to local storage (e.g., storage 408A) reaching capacity levels (as illustrated in storage 408A-C filing up to maximum capacity in FIGS. 4A-4B). In this case, data produced in the locality (e.g., location 1 410) will be discarded, thus impacting the value and reliability of FIGS. 4A-4B despite the fact that there may well be available storage space in the locality that remains unutilized.

Figure 5:
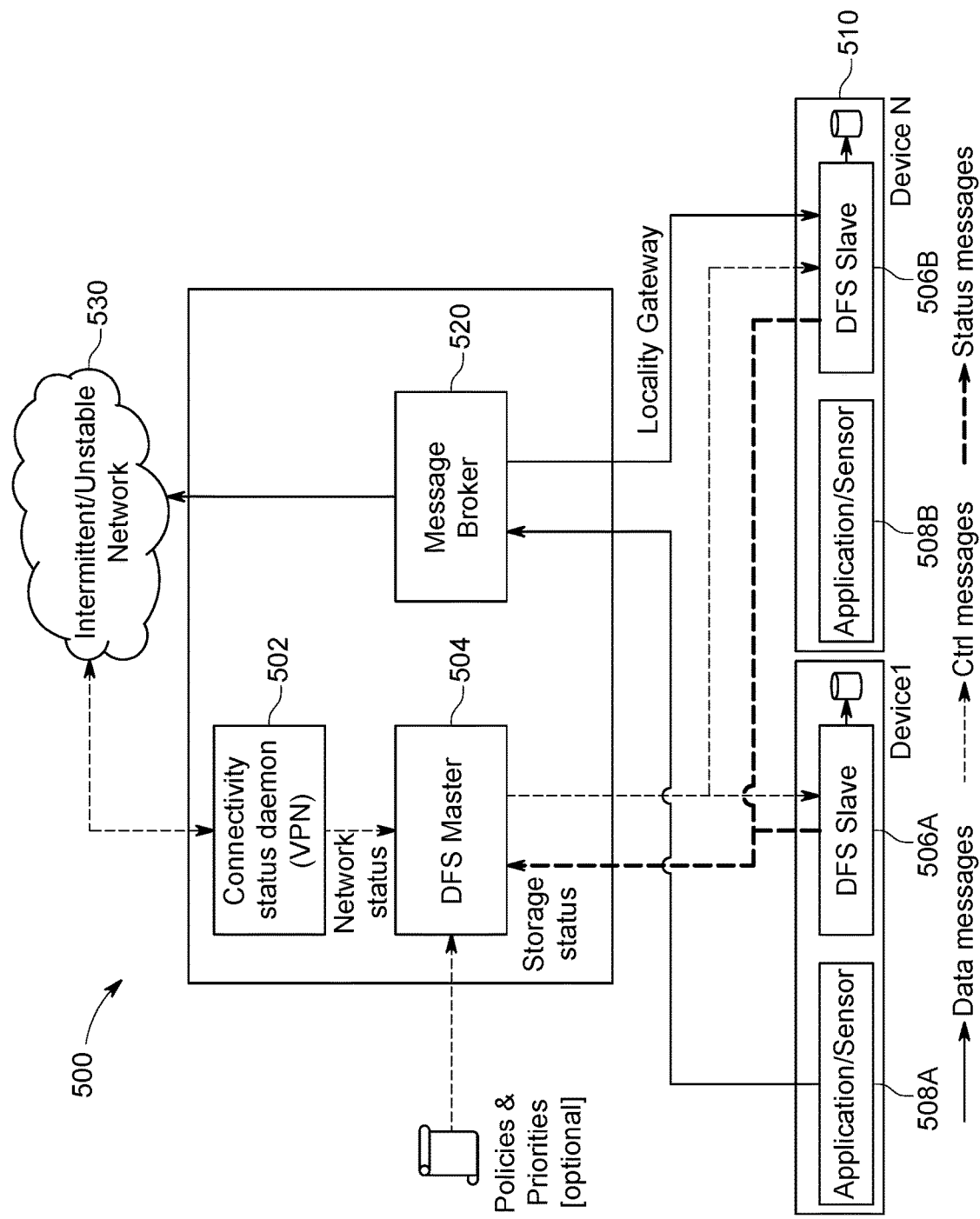
FIG. 5 is an additional block diagram depicting an exemplary system architecture for minimizing data loss in a computer storage environment with non-guaranteed continuous network connectivity in which aspects of the present invention may be realized.

Accordingly, the present invention provides a solution for preventing data loss in an internet of things (IoT) environment. One or more offline events in a locality failing to have continuous network connectivity may be detected. An ad-hoc distributed file system, having one or more edge devices associated with the locality, may be created for storing data produced during the one or more offline events, as illustrated in FIG. 5. FIG. 5 is a block diagram depicting an exemplary system architecture 500 for minimizing data loss in a computer storage environment with non-guaranteed continuous network connectivity. Computer system/server 12 of FIG. 1 may be employed in FIG. 5, incorporating processing unit 16 to perform various computational, data processing and other functionality in accordance with various aspects of the present invention.

The functional components of system architecture 500 may include a locality gateway having a connectivity status daemon 502 (e.g., virtual private network), a DFS master 504, and a message broker 520. The locality gateway may be in communication with an application and a DFS slave, and a storage device such as, for example, application 508A-B, DFS slave 506A-B, and device 1 and device N. The locality gateway may be in communication with an intermittent and/or unstable network 530 (e.g., cloud computing environment 530).

As depicted, in step 1, data produced by an edge application may be sent to the cloud computing environment 530 for further analytics via the cloud connection. The connectivity status daemon 502 notifies the DFS Master 504 when the cloud computing environment 530 connection is no longer active, as in step 2 (network status). In step 3, when the DFS Master 504 is informed of an interruption in the cloud connection, the DFS master 504 notifies (e.g., DFS Initiation Requests) the necessary edge devices (e.g., device 1 or device N) to act as participating nodes in a DFS (e.g., an ad-hoc DFS). In step 4, the data produced (e.g., data streams) by the edge applications 508A-B may continue to be sent to the message broker 520 without interruptions. In step 5, during the offline period, the data streams may be persisted (e.g., persistence for the data streams) in the DFS that may include the DFS Slaves 506A-B running on the edge devices (e.g., device 1 and/or device N). In step 6, the DFS Slaves 506A-B may send periodic updates (e.g., a storage status) to the DFS Master 504 to inform the DFS Master 504 of the available disk space of the device (e.g., device 1 or device N). As an additional aspect, the DFS Master 504 may also include one or more policies and priorities that may be learned, defined, updated, and/or used for minimizing data storage loss and/or assembling an ad-hoc DFS.

Using the mechanisms of the illustrated embodiments such as, for example, the system architecture 500 of FIG. 5, the present invention may detect offline periods/offline events in a locality with unreliable network connectivity and create an ad-hoc DFS. The DFS may include the edge devices belonging to that locality in order to leverage the total available disk space to store data produced during the particular offline period/offline event. Once one or more offline periods/offline events are detected, the edge devices may be assembled together (e.g., work in conjunction with each other) to form a DFS. Edge applications may continue normal operation of producing data streams (during the offline period/event) and may store the data in the ad-hoc DFS. The mechanisms of the illustrated embodiments may identify that the offline period is of sufficient duration that a risk of reaching maximum storage capacity is present (e.g., greater than 50% chance of the storage running out of total disk space) and may compact the stored data into larger intervals, based on the administrator's settings regarding applications' priority levels (i.e., retaining, as a priority, data produced by more critical applications). Moreover, once the network connectivity is restored, data produced during the offline period may be read from the ad-hoc DFS and may forward the data to a cloud computing environment for further analytics, as described below in FIGS. 6A-6B.

Figure 6A:
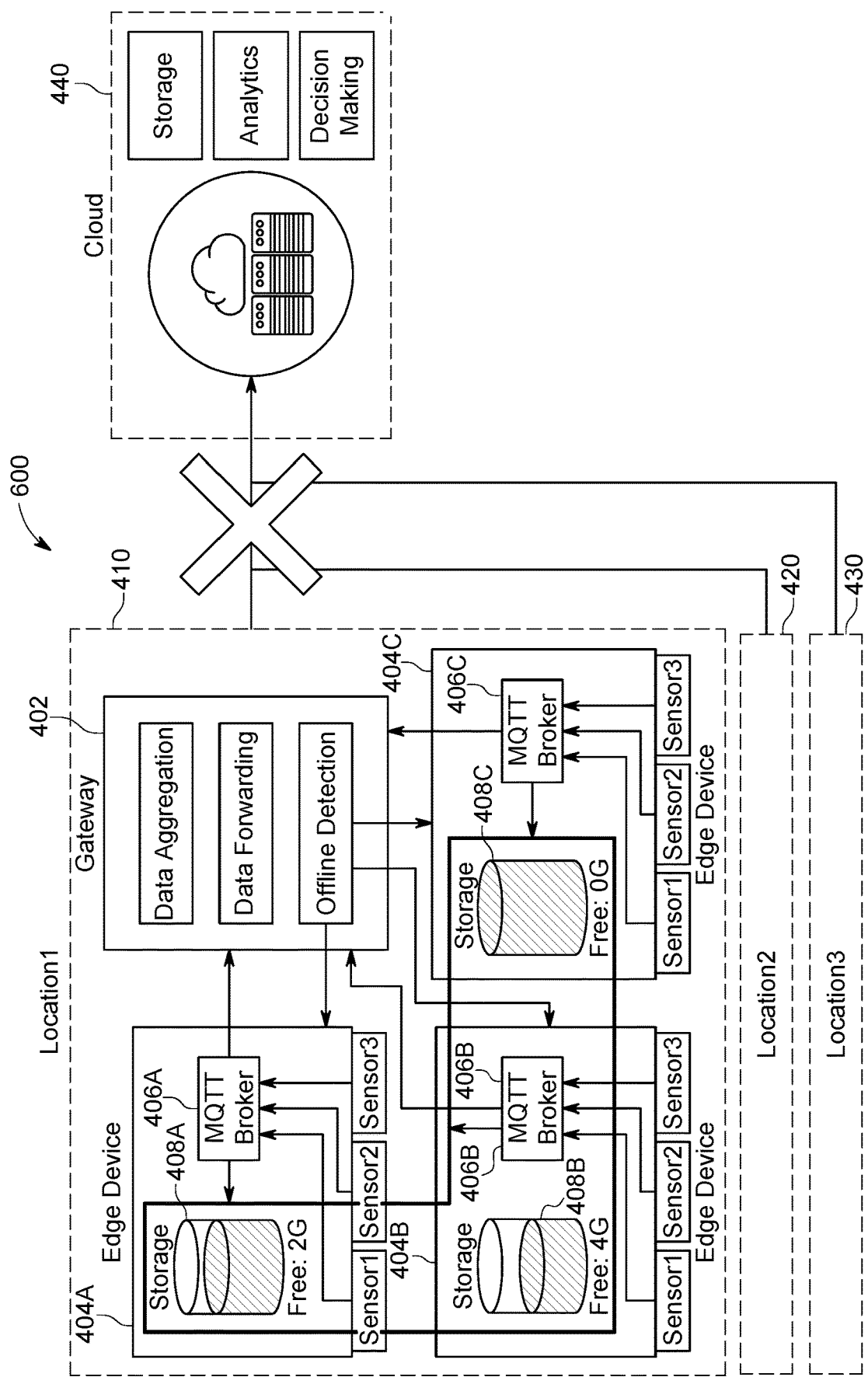
FIGS. 6A-6B are additional block diagrams depicting an exemplary system architecture for minimizing data loss in a computer storage environment with non-guaranteed continuous network connectivity in which aspects of the present invention may be realized.
Figure 6B:
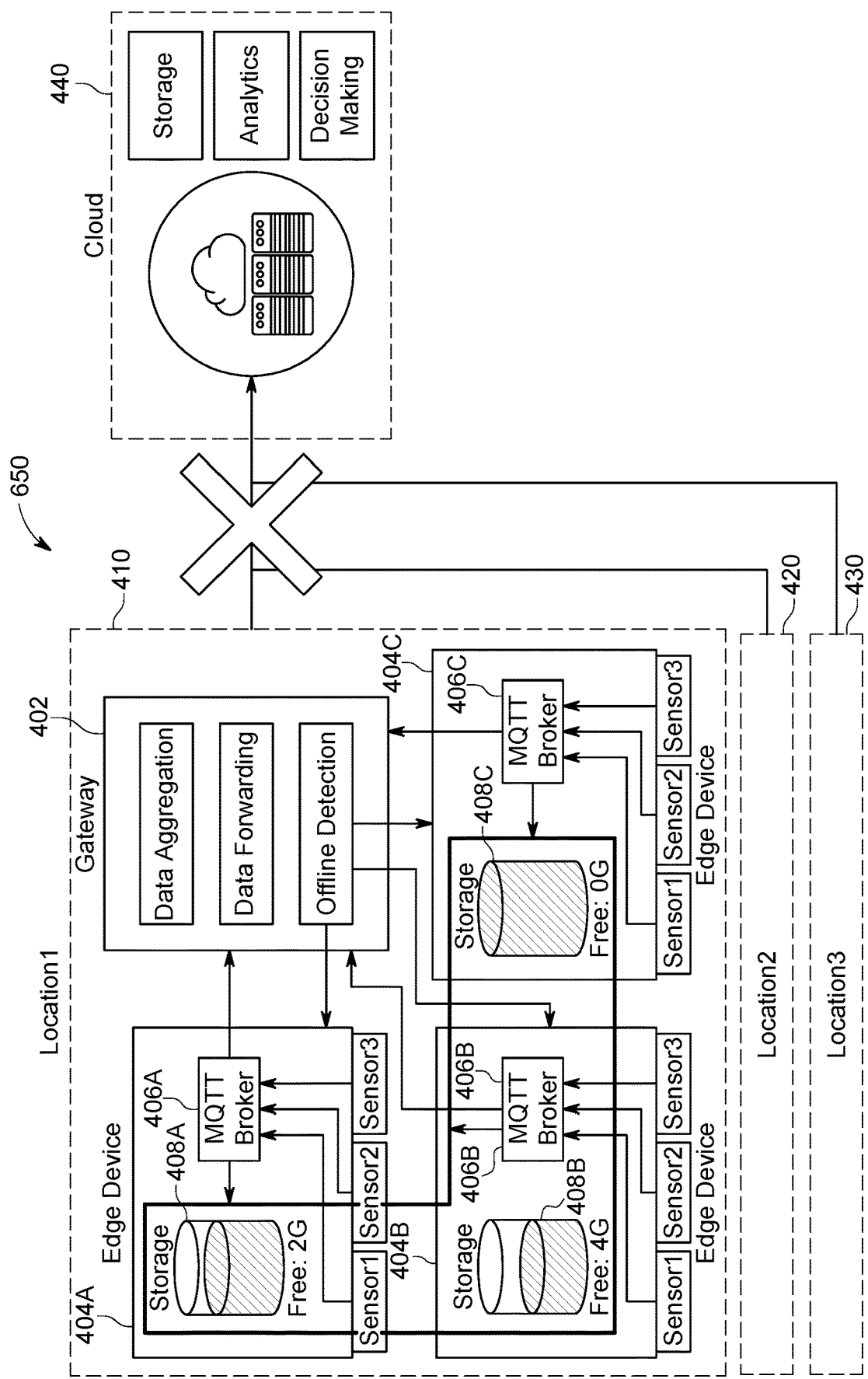

FIGS. 6A-6B are block diagrams depicting an exemplary system architecture 600, 650 for minimizing data loss in a computer storage environment with non-guaranteed continuous network connectivity. Computer system/server 12 of FIG. 1 may be employed in FIGS. 6A-6B, incorporating processing unit 16 to perform various computational, data processing and other functionality. Moreover, the components, devices, functionality, and/or descriptions of FIGS. 1-4 may be employed in FIGS. 6A-6B. Repetitive description of like elements employed in other embodiments described herein (e.g., FIGS. 4A-4B) is omitted for sake of brevity.

Leveraging the system architecture 400 and 450 of FIGS. 4A-4B, once the gateway 402 detects an offlining event (indicated in FIGS. 6A-6B as an "X"), the gateway 402 provides instructions and/or notifications to the devices 404A-C in a locality such as, for example, location 1 410, to form (on-demand) an ad-hoc DFS (illustrated in FIGS. 6A-6B in the shaded-highlighted regions that connect each of the storages in each of the edge devices). Thus, every MQTT broker (e.g., MQTT broker 406A-C) may write data generated from a computing system/device (e.g., sensors 1, 2, and/or 3) to a newly created ad-hoc DFS (e.g., storage 408A-C dynamically grouped together to form on-demand a DFS). When the connection from the locality such as, for example, location 1 410 to the cloud computing environment 440 is restored, the data may be read from the ad-hoc DFS and forwarded to the cloud computing environment 440.

Moreover, the present invention may leverage all the available storage (e.g., storage 408A-C) of the locality such as, for example, location 1 410 during the offline period and minimize the data loss via creating an on-demand, distributed file system. The read and/or write operations of the MQTT broker such as, for example, MQTT broker 406A to the ad-hoc DFS may be transparent since the MQTT broker only needs to know a uniform resource identifier ("URI") of the newly created distributed file system.

Figure 7:
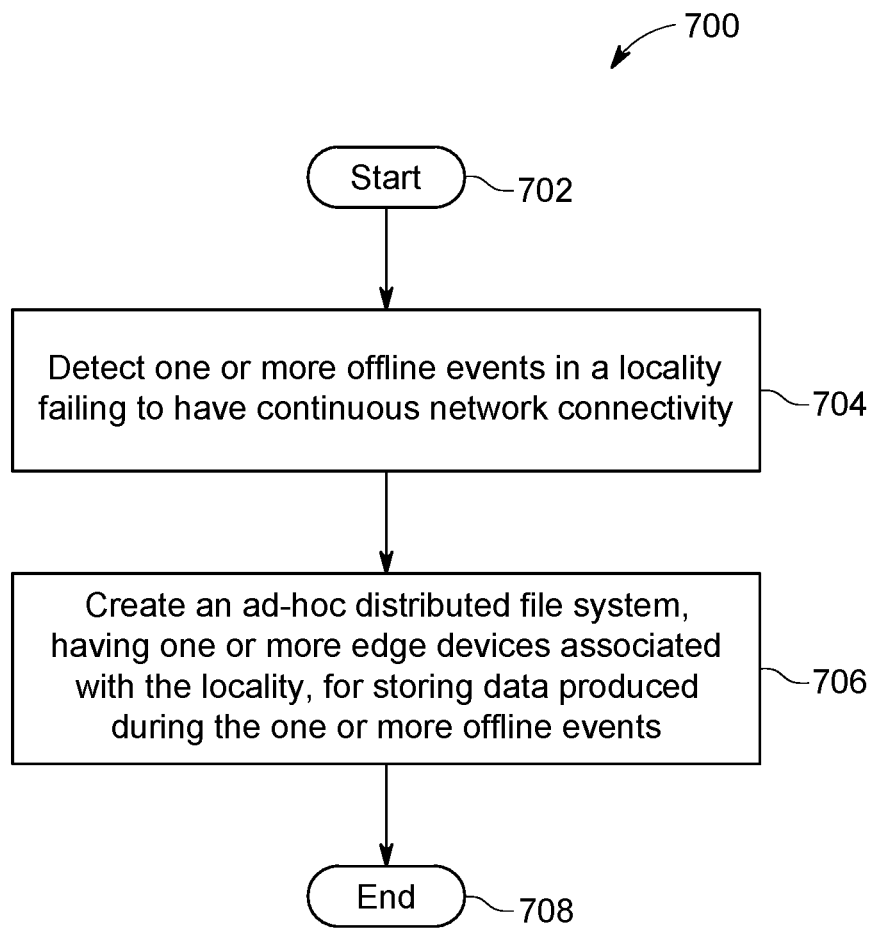
FIG. 7 is a flowchart diagram depicting an exemplary method for minimizing data loss in a computer storage environment with non-guaranteed continuous network connectivity in which aspects of the present invention may be realized.

Turning now to FIG. 7, a method 700 for minimizing data loss in a computer storage environment with non-guaranteed continuous network connectivity in a computing environment by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702. One or more offline events in a locality failing to have continuous network connectivity may be detected, as in block 704. An ad-hoc distributed file system, having one or more edge devices associated with the locality, may be created for storing data produced during the one or more offline events, as in block 706. The functionality 700 may end, as in block 708.

In one aspect, in conjunction with and/or as part of at least one block of FIG. 7, the operations of 700 may include each of the following. The operations of 700 may include detecting a loss of network connectivity between the locality and a cloud computing storage environment using a gateway device of the locality. The operations of 700 may include writing the data to the ad-hoc distributed file system by one or more agents operating on the one or more edge devices, and/or reading the data produced during the one or more offline events from the ad-hoc distributed file system by a gateway device.

The operations of 700 may include determining a network connectivity between the locality and a cloud computing storage environment is restored and forwarding data to a gateway device by one or more agents on the one or more edge devices. Additionally, the operations of 700 may include forwarding data read by a gateway device during the one or more offline events from the ad-hoc distributed file system to a cloud computing storage environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for preventing data loss in a computing storage environment, comprising:

maintaining a plurality of edge devices in a locality, wherein the plurality of edge devices are connected to a network and comprise Internet of Things (IoT) devices streaming data produced respectively thereon directly to a cloud computing storage system notwithstanding whether any local storage exists on at least some of the IoT devices;

detecting one or more offline events in the locality as a loss of network connectivity of the network between the plurality of edge devices in the locality and the cloud computing storage system;

establishing a distributed file system master node in response to the detected one or more offline events;

responsive to receiving the notification of the detected one or more offline events, grouping, by the distributed file system master node, a set of the plurality of edge devices into a region, wherein the region is a new region inclusive of the set of the plurality of edge devices having local storage;

transmitting distributed file system initiation requests, by the distributed file system master node to each of the set of the plurality of edge devices of the region, notifying each of the set of the plurality of edge devices to act as participating nodes in an ad-hoc distributed file system, wherein each of the participating nodes were not part of any distributed file system prior to the notification; and responsive to receiving the distributed file system initiation requests, creating the ad-hoc distributed file system, having the set of the plurality of edge devices associated with the locality, for storing offline data produced during the one or more offline events.

2. The method of claim 1, wherein the distributed file system master node is a gateway device of the locality.

3. The method of claim 1, further including writing the offline data to the ad-hoc distributed file system by one or more agents operating on the set of the plurality of edge devices.

4. The method of claim 1, further including reading the offline data produced during the one or more offline events from the ad-hoc distributed file system by a gateway device.

5. The method of claim 1, further including determining the network connectivity between the locality and the cloud computing storage system is restored.

6. The method of claim 1, further including forwarding the offline data to a gateway device by one or more agents on the set of the plurality of edge devices.

7. The method of claim 1, further including forwarding the offline data read by a gateway device during the one or more offline events from the ad-hoc distributed file system to the cloud computing storage system.

8. A system for preventing data loss in a computing storage environment, comprising:
  one or more computers with executable instructions that when executed cause the system to:
    maintain a plurality of edge devices in a locality, wherein the plurality of edge devices are connected to a network and comprise Internet of Things (IoT) devices streaming data produced respectively thereon directly to a cloud computing storage system notwithstanding whether any local storage exists on at least some of the IoT devices;
    detect one or more offline events in the locality as a loss of network connectivity of the network between the plurality of edge devices in the locality and the cloud computing storage system;
    establish a distributed file system master node of the detected one or more offline events;
    responsive to receiving the notification of the detected one or more offline events, group, by the distributed file system master node, a set of the plurality of edge devices into a region, wherein the region is a new region inclusive of the set of the plurality of edge devices having local storage;
    transmit distributed file system initiation requests, by the distributed file system master node to each of the set of the plurality of edge devices of the region, notifying each of the set of the plurality of edge devices to act as participating nodes in an ad-hoc distributed file system, wherein each of the participating nodes were not part of any distributed file system prior to the notification; and
    responsive to receiving the distributed file system initiation requests, create the ad-hoc distributed file system, having the set of the plurality of edge devices associated with the locality, for storing offline data produced during the one or more offline events.

9. The system of claim 8, wherein the distributed file system master node is a gateway device of the locality.

10. The system of claim 8, wherein the executable instructions that when executed cause the system to write the offline data to the ad-hoc distributed file system by one or more agents operating on the set of the plurality of edge devices.

11. The system of claim 8, wherein the executable instructions that when executed cause the system to read the offline data produced during the one or more offline events from the ad-hoc distributed file system by a gateway device.

12. The system of claim 8, wherein the executable instructions that when executed cause the system to
  determine the network connectivity between the locality and the cloud computing storage system is restored.

13. The system of claim 8, wherein the executable instructions that when executed cause the system to forward the offline data to a gateway device by one or more agents on the set of the plurality of edge devices.

14. The system of claim 8, wherein the executable instructions that when executed cause the system to forward the offline data read by a gateway device during the one or more offline events from the ad-hoc distributed file system to the cloud computing storage system.

15. A computer program product for, by a processor, preventing data loss in a computing storage environment, the computer program product comprising a non-transitory computer-readable storage medium having computer-readable program code portions stored therein, the computer-readable program code portions comprising:
  an executable portion that maintains a plurality of edge devices in a locality, wherein the plurality of edge devices are connected to a network and comprise Internet of Things (IoT) devices streaming data produced respectively thereon directly to a cloud computing storage system notwithstanding whether any local storage exists on at least some of the IoT devices;
  an executable portion that detects one or more offline events in the locality as a loss of network connectivity of the network between the plurality of edge devices in the locality and the cloud computing storage system;
  an executable portion that establishes a distributed file system master node of the detected one or more offline events;
  an executable portion that, responsive to receiving the notification of the detected one or more offline events, groups, by the distributed file system master node, a set of the plurality of edge devices into a region, wherein the region is a new region inclusive of the set of the plurality of edge devices having local storage;
  an executable portion that transmits distributed file system initiation requests, by the distributed file system master node to each of the set of the plurality of edge devices of the region, notifying each of the set of the plurality of edge devices to act as participating nodes in an ad-hoc distributed file system, wherein each of the participating nodes were not part of any distributed file system prior to the notification; and
  an executable portion that, responsive to receiving the distributed file system initiation requests, creates the ad-hoc distributed file system, having the set of the plurality of edge devices associated with the locality, for storing offline data produced during the one or more offline events.

16. The computer program product of claim 15, wherein the distributed file system master node is a gateway device of the locality.

17. The computer program product of claim 15, further including an executable portion that:
  writes the offline data to the ad-hoc distributed file system by one or more agents operating on the set of the plurality of edge devices; or
  reads the offline data produced during the one or more offline events from the ad-hoc distributed file system by a gateway device.

18. The computer program product of claim 15, further including an executable portion that determines the network connectivity between the locality and the cloud computing storage system is restored.

19. The computer program product of claim 15, further including an executable portion that forwards the offline data to a gateway device by one or more agents on the set of the plurality of edge devices.

20. The computer program product of claim 15, further including an executable portion that forwards the offline data read by a gateway device during the one or more offline events from the ad-hoc distributed file system to the cloud computing storage system.

\* \* \* \* \*